United States Patent [19]

Stehlin

[11] 3,949,654

[45] Apr. 13, 1976

[54] ASSEMBLY FOR USE IN A MACHINE FOR PROCESSING SHEET OR SIMILAR MATERIAL

[75] Inventor: Hubert Stehlin, Caluire, France

[73] Assignee: S. A. Martin, Saint-Priest, France

[22] Filed: Apr. 25, 1975

[21] Appl. No.: 571,747

[30] Foreign Application Priority Data

June 21, 1974 France .............................. 74.21657

[52] U.S. Cl. .................... 93/58.2 R; 83/498; 83/506

[51] Int. Cl.$^2$ ...................... B31B 1/14; B23D 19/04

[58] Field of Search .......... 93/58.2, 58.1; 83/8, 498, 83/506

[56] References Cited

UNITED STATES PATENTS 3,257,882 6/1966 Lulie et al. ........................ 93/58.2 R 3,386,323 6/1968 Dovey .............................. 93/58.2 R

*Primary Examiner*—Travis S. McGehee

*Attorney, Agent, or Firm*—Haseltine, Lake & Waters

[57] ABSTRACT

An assembly for use in a machine for processing sheet or similar material comprising a rotatable tool and an opposing part between which the sheet material is fed and each mounted on a respective block and positionally adjustable relative thereto to vary the spacing between the tool and its opposing part, each block being movable in a direction transversely of the feed direction, and means for driving the tool and its opposing part each comprising a pinion supported on the block and meshing with a toothed shaft extending transversely of the direction of sheet material feed, wherein the toothed shafts are positioned so as to operate as feed rollers for feeding sheet material to the tool and its opposing part.

3 Claims, 3 Drawing Figures

ASSEMBLY FOR USE IN A MACHINE FOR PROCESSING SHEET OR SIMILAR MATERIAL

The present invention refers to the driving of a rotatable tool and its associated opposing part, particularly but not exclusively for use in a machine for processing sheets of cardboard.

In the processing of sheets of cardboard, particularly corrugated cardboard, to produce blanks for packing cases or accessories such as internal packing pieces, the blanks are often passed through a machine having rotary tools which make cuts in the blank in the direction of passage of the blank through the machine. These cuts may extend completely through the blank and form longitudinal splits or may only extend through a part of this thickness of the blank in order, for example, to enable easy accordeon-pleating subsequently without increased thickness. In the first case rotary knives are employed which overlap in pairs, each mounted on a different shaft, the blank passing between the two shafts. In the second case a single knife is generally employed, having a single edge, the cardboard passing between the knife and a similarly rotating opposing part, arranged so that the distance between the edge of the knife and the opposing part enables the knife to cut through only a moreorless large fraction of the thickness of the cardboard blank.

Depending on the dimensions of the sheets of cardboard, it is necessary to be able to displace the knives transversely. In addition, when knives working with an opposing part are employed, it is also necessary to be able to adjust the pitch or space between the axes of the knife and the opposing part in dependence on the thickness of the cardboard sheets and the depth of cut required. These requirements have led to the mounting of the knives and the opposing parts on blocks movable transversely of the machine. In general these blocks are displaceable along a fixed crossbar of the machine and are provided with a device for locking the block to the crossbar at any transverse position. In order to ensure continuous drive whatever the transverse working position, the knives and the opposing parts are each fast with a coaxial pinion which meshes with an intermediate slidable pinion which is mounted on the movable block. During transverse displacement the pinion always remains in mesh with a toothed control-shaft extending across the width of the machine.

It will be seen that this usual arrangement requires the provision in the machine of two control shafts solely employed for driving the knives. Developments in corrugated cardboard packaging is leading at present to the employment of processing machines of greater and greater working width, and in order to avoid oscillation and flexing of the driving shafts of consequently great length one is obliged to increase their diameter. The result is a considerable increase in weight and cost of the machine.

Use of the present invention can enable simplification of the machine by elimination of special shafts for driving the knives.

According to the invention there is provided an assembly for use in a machine for processing sheet or similar material comprising a rotatable tool and an opposing part between which the sheet material is fed and each mounted on a respective block and positionally adjustable relative thereto to vary the spacing between the tool and its opposing part, each block being movable in a direction transversely of the feed direction, and means for driving the tool and its opposing part each comprising a pinion supported on the block and meshing with a toothed shaft extending transversely of the direction of sheet material feed, wherein the toothed shafts are positioned so as to operate as feed rollers for feeding sheet material to the tool and its opposing part.

In an embodiment of the invention the periphery of the opposing part associated with the rotary tool is formed with an external set of teeth in mesh with the pinion of the opposing part drive means.

The invention will be more fully understood from the following description of an embodiment thereof, given by way of example only, with reference to the accompanying drawings.

Figure 1:
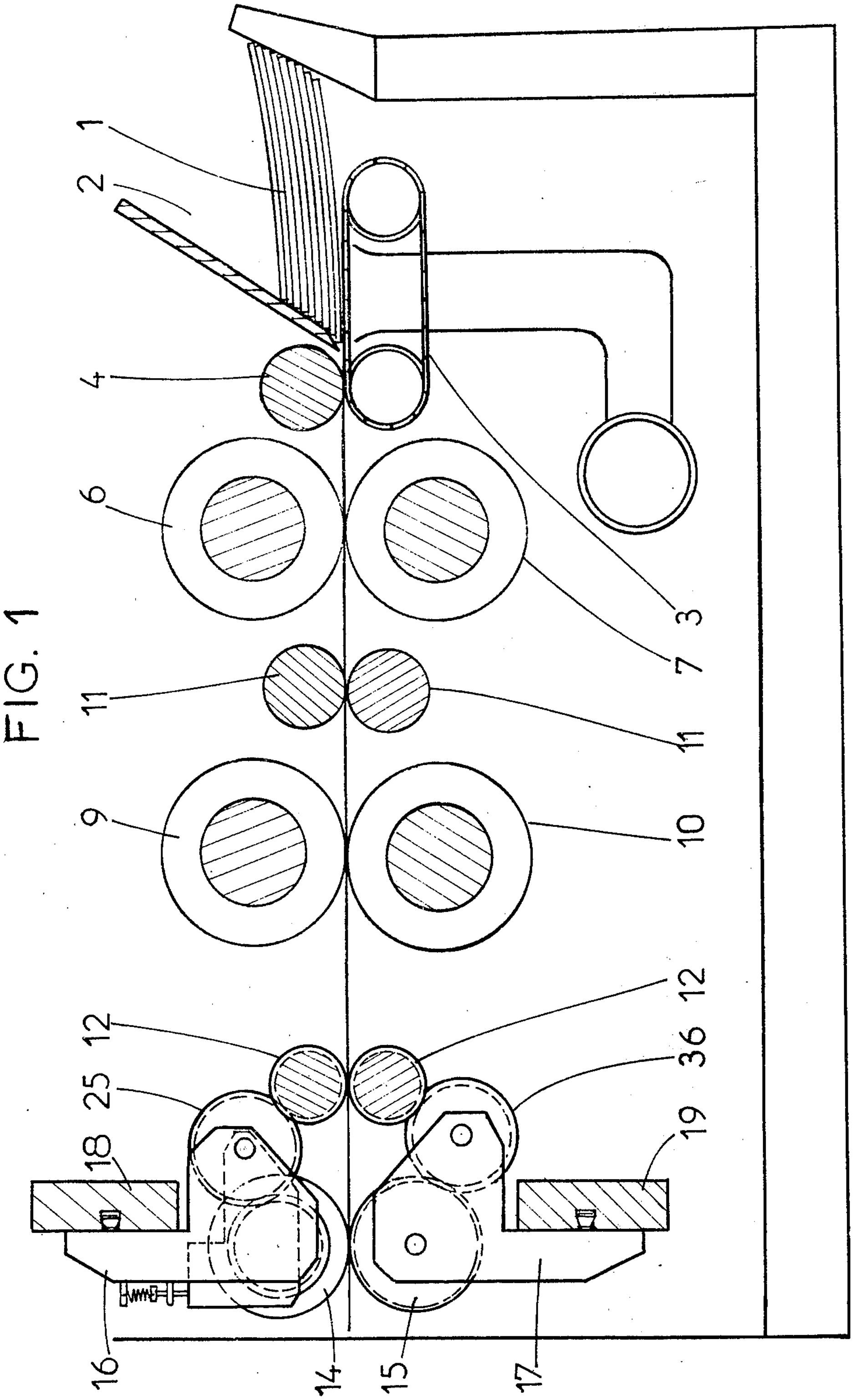
FIG. 1 is an overall diagrammatic view of a machine for processing sheets of corrugated cardboard and including an embodiment of an assembly in accordance with the invention.

Referring to FIG. 1 there is seen a machine for processing sheets 1 of corrugated cardboard in which the sheets 1 stacked in a magazine 2 are successively withdrawn from the magazine 2 by a device including a suction belt 3 which engages the lowermost sheet in the stack. The sheet is then fed by a drive roller 4 between one or more first tools 6 and opposing parts 7 where it undergoes first compression or local crushing to mark the lines along which the sheets will be folded in its ultimate use. This compression is completed between one or more second tools 9 and opposing parts 10. Between the compression stations the sheet is supported by smooth drive rollers 11. After passing between another pair of drive rollers 12 the sheet is cut longitudinally by passing between one or more rotary knives 14 and opposing parts 15. The compression tools 6, 7, 9 and 10 are adjustable in their transverse position depending upon the required location of the lines of fold, and similarly the knives 14 and opposing parts 15 are likewise adjustable in transverse position. For this purpose the knives 14 and the opposing parts 15 are carried by movable blocks 16 and 17 respectively, which can be displaced along crossbars 18 and 19.

Figure 3:
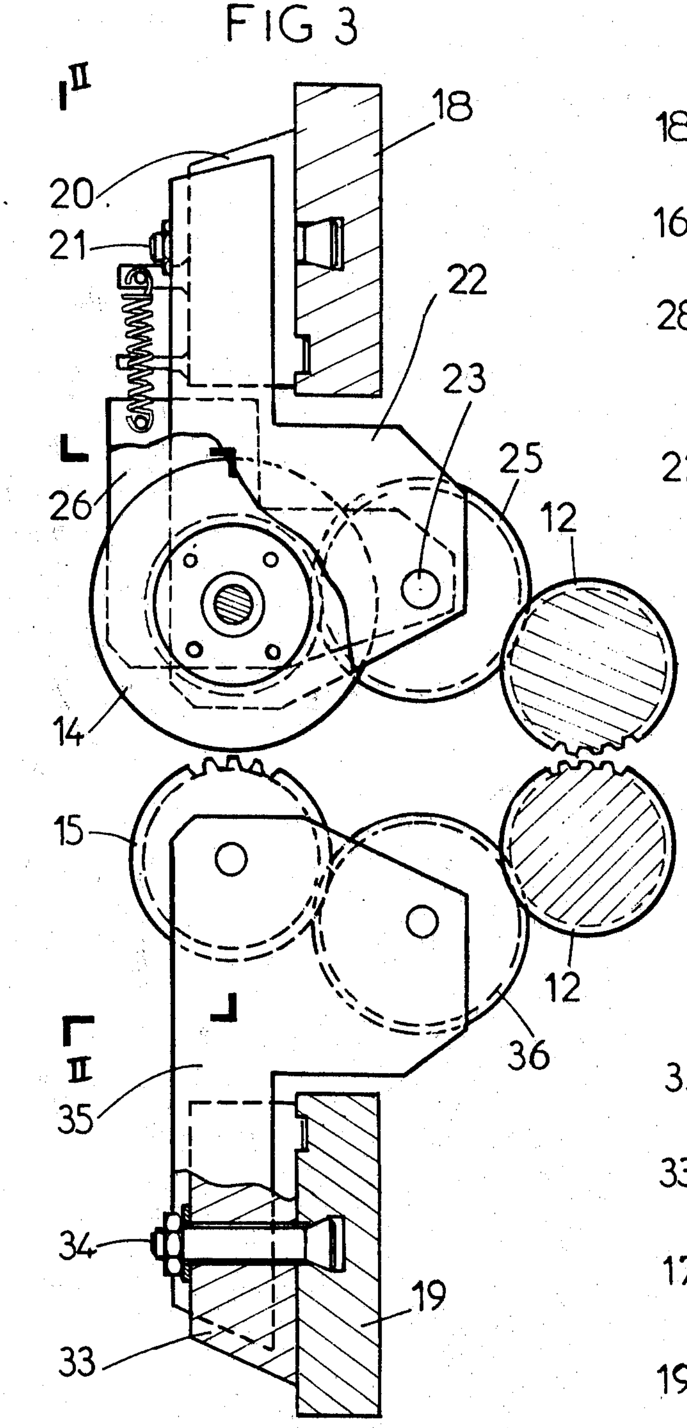
FIG. 3 is a side view partially in section along the line III—III in FIG. 2, of the output end of the machine in FIG. 1.
Figure 2:
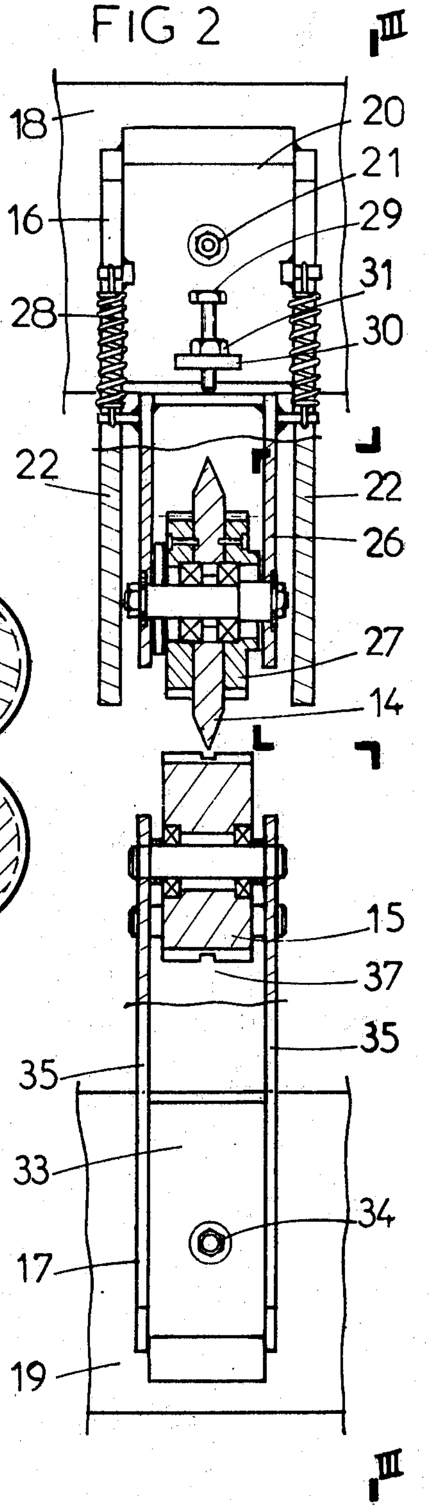
FIG. 2 is a front view on a larger scale of the output end of the machine of FIG. 1 in partial section along the line II-II in FIG. 3.

Referring to FIGS. 2 and 3, it will be seen that the movable block 16 carrying the knife 14 has a shoe 20 sliding along the crossbar 18 to which it may be locked by tightening a unit on a bolt 21 the head of which engages in a groove in the crossbar 18. The shoe 20 is framed by two cheeks 22 supporting a hingepin 23 common to an intermediate slidable pinion 25 and to an intermediate housing 26. The housing 26 supports the spindle of the rotary knife 14 which is fast with a pinion 27 which meshes with the pinion 25. The vertical position of the knife 14 is adjustable by angular adjustment of the housing 26 about its hinge pin 23. Springs 28 keep the housing 26 bearing against an adjustable stop-screw 29 which is engaged in an element 30 of the shoe 20 and can be locked by a locknut 31.

In a similar fashion the movable block 17 carrying the opposing part 15 comprises a shoe 33 sliding along the crossbar 19 on to which it may be locked by tightening a nut on a bolt 34. Two cheeks 35 support directly both the opposing part 15 and a slidable intermediate pinion 36. The opposing part 15 has an external set of teeth constantly in mesh with the intermediate pinion 36, the teeth being interrupted in the central plane of the part 15 by a groove 37 opposite the cutting-edge of the knife 14.

The driving rollers 12 extending across the machine are also toothed, the slidable pinions 25 and 36 always being in mesh respectively with the upper and lower rollers 12 for all positions of the movable blocks 16 and 17. The two rollers 12 are not in mesh but are separated by the space necessary for the cardboard sheets to pass between them.

It can be seen that in the above described machine the drive rollers 12 ensure both conveyance of the sheets through the machine and drive the knives and their opposing parts, the setting in motion of which is thus effected directly. The employment of toothed shafts as drive rollers or as opposing parts for the knives does not bring about any perceptible marking of the cardboard sheets and enables the saving of two transverse shafts, which are of large diameter, as well as the saving of the corresponding set of driving pinions.

It will be observed again that the above described driving arrangement normally enables the knife to be run at a peripheral speed higher than the linear speed of the cardboard sheets passing through the machine, as is usual for improving the cut, whilst the speed of the periphery of the opposing part can remain equal to the linear speed of the cardboard sheets.

It will be appreciated that the knife carrying and opposing part carrying blocks may be mounted on the upper and lower supporting crossbars respectively or vice versa, in order to produce cuts in the upper or lower face of the cardboard sheets.

It will also be appreciated that the invention is not intended to be limited to the embodiment which has just been described but covers embodiments which differ only in detail, and in the employment of equivalent means. Additionally the invention is not intended to be limited to the driving of rotary knives acting against an opposing part, but is applicable to any rotary tool such as tools 6 and 9, which requires individual radial adjustment, that is to say, special adjustment of the pitch or space between its axis and that of its associated opposing part; in this case it is not possible to mount all the tools on a continuous common shaft but they must be supported by individual movable blocks provided with a slidable pinion.

What is claimed is:

1. An assembly for use in a machine for processing sheet or similar material, comprising:

- a rotatable tool;
- an associated opposing part between which and said rotatable tool sheet material is fed;
- a block in respect of each of said tool and said opposing part;
- means for mounting said tool and said opposing part on the said respective block for adjustment in a direction to vary the spacing between said tool and said opposing part;
- means for mounting said blocks for movement transversely to the direction of sheet material feed;
- drive means in respect of each of said tool and said opposing part and each comprising a pinion mounted on the said respective block and a toothed shaft extending transversely of the direction of sheet material feed and with which said pinion meshes;
- wherein said toothed shafts are so positioned and arranged as to operate as feed rollers for feeding sheet material to said tool and said opposing part.

2. An assembly as claimed in claim 1, wherein the periphery of said opposing part is toothed and meshes with said pinion of said opposing part drive means.

3. An assembly as claimed in claim 2, wherein the teeth on said periphery of said opposing part are interrupted so as to form a peripheral groove co-operating with said tool.

* * * * *